US008577931B2

(12) United States Patent
Yen

(10) Patent No.: US 8,577,931 B2
(45) Date of Patent: Nov. 5, 2013

(54) SYSTEMS AND METHODS FOR MODELING BUILDING RESOURCES

(75) Inventor: Peter N. Yen, New South Wales (AU)

(73) Assignee: Honeywell International Inc., Morristown, NJ (US)

( * ) Notice: Subject to any disclaimer, the term of this patent is extended or adjusted under 35 U.S.C. 154(b) by 719 days.

(21) Appl. No.: 12/601,239

(22) PCT Filed: May 20, 2008
(Under 37 CFR 1.47)

(86) PCT No.: PCT/AU2008/000710
§ 371 (c)(1),
(2), (4) Date: Sep. 17, 2010

(87) PCT Pub. No.: WO2008/141382
PCT Pub. Date: Nov. 27, 2008

(65) Prior Publication Data
US 2011/0154265 A1    Jun. 23, 2011

(30) Foreign Application Priority Data
May 21, 2007    (AU) ................................. 2007902713

(51) Int. Cl.
*G06F 7/00* (2006.01)
(52) U.S. Cl.
USPC ............................ 707/804; 707/797; 707/956
(58) Field of Classification Search
CPC ..................... G06F 17/30595; G06F 17/30286; G06Q 10/06
USPC ................... 707/710, 797, 956, 999.102, 804
See application file for complete search history.

(56) References Cited

U.S. PATENT DOCUMENTS

| 5,361,347 | A | * | 11/1994 | Glider et al. ..................... 714/44 |
| 5,764,913 | A | * | 6/1998 | Jancke et al. ................. 709/224 |
| 6,381,579 | B1 | * | 4/2002 | Gervais et al. ............... 705/7.13 |
| 6,389,331 | B1 | | 5/2002 | Jensen et al. |
| 6,760,733 | B1 | * | 7/2004 | Komine et al. ........................ 1/1 |
| 6,944,626 | B2 | * | 9/2005 | Cameron et al. .............. 707/786 |
| 6,950,825 | B2 | * | 9/2005 | Chang et al. ........................... 1/1 |
| 7,076,255 | B2 | * | 7/2006 | Parupudi et al. ........... 455/456.1 |
| 7,356,432 | B1 | * | 4/2008 | Lang .............................. 702/117 |

(Continued)

FOREIGN PATENT DOCUMENTS

| WO | 2004061596 A2 | 7/2004 |
| WO | 2007024573 A2 | 3/2007 |

OTHER PUBLICATIONS

Honeywell, "Excel Building Supervisor-Integrated R7044 and FS90 Ver. 2.0," Operator Manual, 76 pages, Apr. 1995.

(Continued)

*Primary Examiner* — Phuong Thao Cao
(74) *Attorney, Agent, or Firm* — Seager Tufte & Wichhem LLC.

(57) ABSTRACT

Described herein are systems and methods for modeling building resources. In overview, building resources are represented by points defined in an information system. These points are defined in a manner so as to allow the generation of a hierarchical structure on their basis. A logical representation of this hierarchical structure, or part of this hierarchical structure, is viewable by a client, for example by way of a browser application. In various embodiments, the logical representation implements functionalities including alarm aggregation and/or scope of responsibility filtering.

18 Claims, 11 Drawing Sheets

Exemplary Screenshot

(56) References Cited

U.S. PATENT DOCUMENTS

| | | | |
|---|---|---|---|
| 7,389,496 B2 * | 6/2008 | Eckhart et al. | 717/127 |
| 7,493,565 B2 * | 2/2009 | Parupudi et al. | 715/744 |
| 7,603,374 B2 * | 10/2009 | Cameron et al. | 1/1 |
| 7,623,547 B2 * | 11/2009 | Dooley et al. | 370/466 |
| 7,703,019 B2 * | 4/2010 | Petrov et al. | 715/736 |
| 7,756,968 B1 * | 7/2010 | Frey et al. | 709/224 |
| 7,865,499 B2 * | 1/2011 | Schumacher | 707/711 |
| 8,086,608 B2 * | 12/2011 | Hampton | 707/737 |
| 2002/0091819 A1 * | 7/2002 | Melchione et al. | 709/224 |
| 2002/0099690 A1 * | 7/2002 | Schumacher | 707/1 |
| 2003/0011647 A1 * | 1/2003 | Abbondanzio et al. | 345/853 |
| 2003/0093672 A1 * | 5/2003 | Cichowlas | 713/168 |
| 2003/0110106 A1 * | 6/2003 | Deshpande et al. | 705/35 |
| 2003/0135339 A1 | 7/2003 | Gristina et al. | |
| 2003/0218641 A1 * | 11/2003 | Longobardi | 345/853 |
| 2003/0229623 A1 * | 12/2003 | Chang et al. | 707/3 |
| 2004/0158583 A1 * | 8/2004 | Kaappa | 707/104.1 |
| 2004/0236655 A1 * | 11/2004 | Scumniotales et al. | 705/36 |
| 2005/0091252 A1 * | 4/2005 | Liebich et al. | 707/102 |
| 2005/0149539 A1 * | 7/2005 | Cameron et al. | 707/100 |
| 2006/0005036 A1 * | 1/2006 | Hu et al. | 713/182 |
| 2006/0074609 A1 * | 4/2006 | Freeman et al. | 703/1 |
| 2006/0079999 A1 | 4/2006 | Husein | |
| 2006/0122980 A1 * | 6/2006 | He et al. | 707/3 |
| 2006/0126636 A1 * | 6/2006 | Dooley et al. | 370/395.3 |
| 2006/0265664 A1 * | 11/2006 | Simons et al. | 715/772 |
| 2007/0016601 A1 * | 1/2007 | Cameron et al. | 707/101 |
| 2007/0110047 A1 * | 5/2007 | Kim | 370/389 |
| 2007/0198545 A1 * | 8/2007 | Ge et al. | 707/100 |
| 2008/0016546 A1 * | 1/2008 | Li et al. | 726/1 |
| 2008/0060058 A1 * | 3/2008 | Shea et al. | 726/4 |
| 2008/0098453 A1 * | 4/2008 | Hinton et al. | 726/1 |
| 2008/0148190 A1 * | 6/2008 | Schaff | 715/853 |
| 2008/0256241 A1 * | 10/2008 | Graser et al. | 709/226 |
| 2009/0094682 A1 * | 4/2009 | Sage et al. | 726/4 |
| 2009/0100085 A1 * | 4/2009 | Hampton | 707/102 |
| 2009/0177863 A1 * | 7/2009 | Rehman et al. | 712/30 |

OTHER PUBLICATIONS

Trane, "System Programming, Tracer Summit Version 14, BMTW-SVP01D-EN," 623 pages, 2002.

* cited by examiner

SYSTEMS AND METHODS FOR MODELING BUILDING RESOURCES

FIELD OF THE INVENTION

The present invention relates to systems and methods for modeling building resources. Embodiments of the invention have been developed for allowing users to navigate data indicative of building resources by way of a hierarchical interface. While some embodiments will be described herein with particular reference to such applications, it will be appreciated that the invention is not limited to such a field of use, and is applicable in broader contexts.

BACKGROUND

Any discussion of the prior art throughout the specification should in no way be considered as an admission that such prior art is widely known or forms part of common general knowledge in the field.

Building management systems are widely used by organizations and property owners who wish to monitor building resources in a centralized manner. Such systems typically provide an interface whereby a plurality of building resources are able to be monitored. To this end, building management systems include a range of hardware and software components. For example, the hardware components include controllers, routers, servers and so on that integrate building resources that are to be monitored (such as physical assets) into a common networked environment, and the software components provide the necessary instructions to allow data regarding these hardware components and physical assets to be monitored by clients.

Prior art building management systems tend to arrange building resources in a manner that is, at least arguably, unintuitive. It follows that there is a need for improved systems and methods for modeling building resources.

SUMMARY OF THE INVENTION

It is an object of the present invention to overcome or ameliorate at least one of the disadvantages of the prior art, or to provide a useful alternative.

A first aspect of the present invention provides a method for modeling building resources, the method including the steps of
- (a) receiving data indicative of a plurality of points, each point including data indicative of an item name, data indicative of a containment parent, and data indicative of an operational state;
- (b) for the plurality of points, on the basis of their respective data indicative of containment parents, generating a construct indicative of a hierarchical structure wherein each point is nested beneath its containment parent;
- (c) in the case that, for a given one of the points, the data indicative of an operational state meets predefined characteristics, associating an alarm condition with that point;
- (d) upwardly aggregating alarm conditions in the hierarchical structure such that an alarm condition associated with a given one of the points is identifiable based on one or more points beneath which that point is nested.

A second aspect of the present invention provides a method for modeling building resources, the method including the steps of:
- (a) reading from a storage location data indicative of a plurality of points, each point including data indicative of an item name, data indicative of a containment parent, and data indicative of an operational state;
- (b) for the plurality of points, on the basis of their respective data indicative of containment parents, generating a construct indicative of a hierarchical structure wherein each point is nested beneath its containment parent;
- (c) being responsive to a request from a client to access the construct for determining a scope of responsibility for the client;
- (d) on the basis of the scope of responsibility, identifying one or more of the points in the construct that are to be made available to the client;
- (e) making available to the client data indicative of the identified one or more points such that the client is able to view an interactive representation of those points in a hierarchical structure.

One embodiment provides a method for modeling building resources, the method including the steps of:
- (a) identifying data indicative of a plurality of points, each point including data indicative of an item name, and data indicative of a containment parent, wherein the points have a common containment parent describing a first building zone; and
- (b) creating a duplicate branch based on the common containment parent, wherein the duplicate branch provides a template for describing a second building zone, and wherein respective duplications of one or more of the plurality of points are assigned respective adjusted item names.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

Various embodiments of the invention will now be described, by way of example only, with reference to the accompanying drawings in which.

DETAILED DESCRIPTION

Described herein are systems and methods for modeling building resources. In overview, building resources are represented by points defined in an information system. These points are defined in a manner so as to allow the generation of a hierarchical structure on their basis. A logical representation of this hierarchical structure, or part of this hierarchical structure, is viewable by a client, for example by way of a browser application. In various embodiments, the logical representation implements functionalities including alarm aggregation and/or scope of responsibility filtering.

Figure 1:
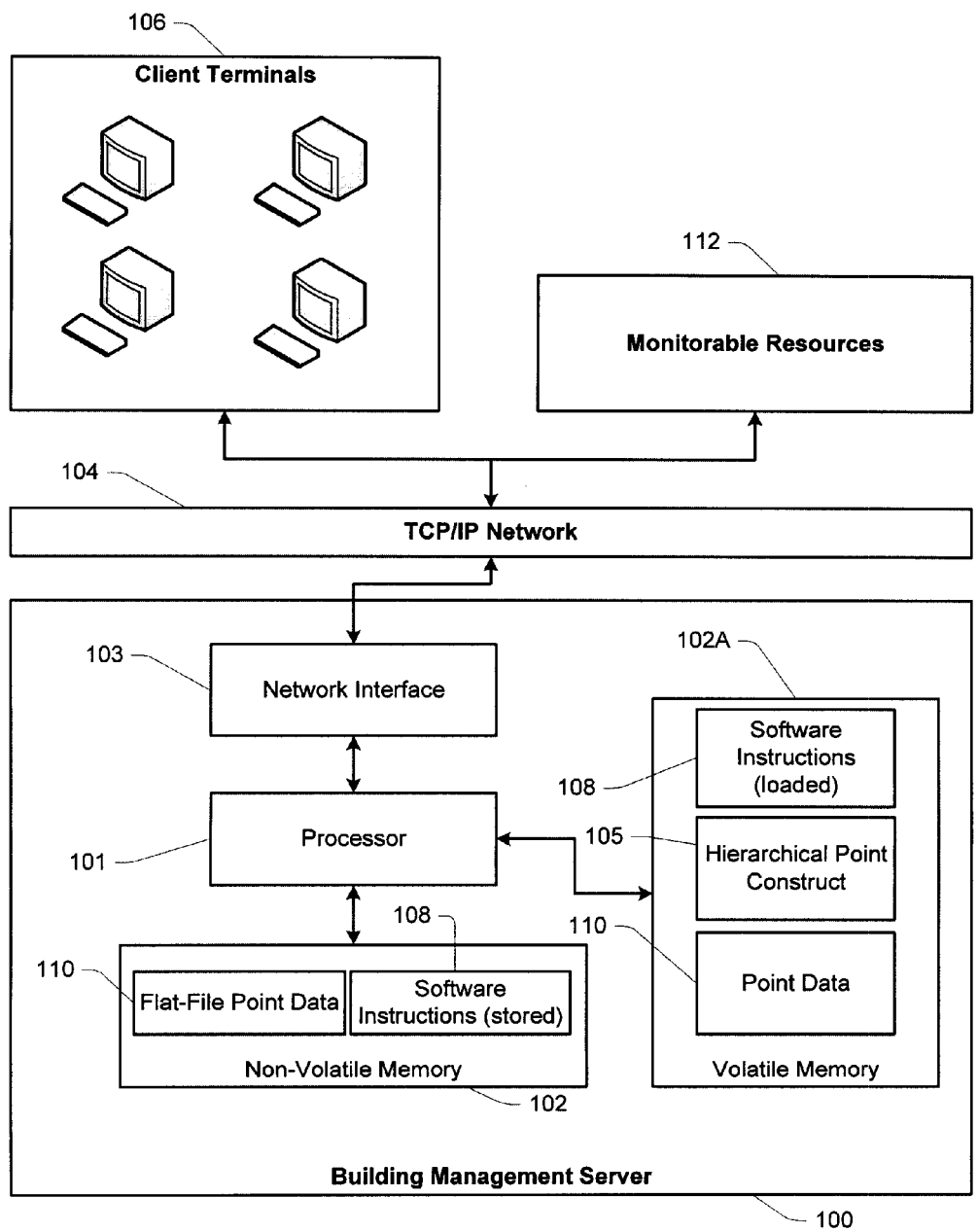
FIG. 1 is a schematic representation of a building management system according to one embodiment.

FIG. 1 illustrates a system for managing building resources, in the form of a building management server 100. Server 100 includes a processor 101 coupled to non-volatile memory 102, volatile memory 102A and a network interface 103. In overview, server 100, by way of network interface 103, makes available over a TCP/IP network 104 data indicative of a hierarchical point construct 105. This data is used to provide on client terminals 106 interactive graphical representations for some or all of construct 105. For example, in some embodiments the graphical representations are rendered in a browser application executing on one of client terminals 106 on the basis of data obtained from server 100 via network 104.

Software instructions 108 are maintained in the volatile memory and non-volatile memory of server 100. These software instructions are executed by processor 101 to allow server 100 to perform various methods discussed herein, including methods of managing building resources.

Although FIG. 1 schematically illustrates server 100 as a single component, in alternate embodiments server 100 is defined by a plurality of distributed components, in some cases including a plurality of individual servers and/or data storage devices. Furthermore, it will be appreciated that references to a TCP/IP network should not be regarded as limiting, and in alternate embodiments other networking means are used. In some embodiments network 104 includes a plurality of individual networks.

Non-volatile memory 102 maintains data indicative of a plurality of "points", in the form of point data 110. Point data 110, in the present embodiment, is defined by one or more flat files and/or databases including data for the plurality of individual points. Each point is defined by a set of data describing a building resource. The term "building resource" should be read broadly. In the present embodiments, building resources include both monitorable building resources 112, which are described by process points, and virtual building resources, which are described by location points.

A monitorable resource is a physical building resource (or aspect of a physical building resource) that has a value monitorable via network 104. It will be appreciated that a primary focus of a building management system is to make available to clients data indicative of the status of monitorable resources. In one simple practical example, a monitorable resource is a temperature value provided by a thermostat at a given location or within a certain piece of equipment. This temperature value is maintained by or made available to a networked device, and obtained by server 100 over network 104.

A point that describes a monitorable resource is referred to herein as a process point and, once loaded in construct 105, periodically obtains over network 104 data indicative of the monitored value. In this sense, process points periodically call a function to obtain the relevant value. For example, in the present embodiment server 100 implements a predefined scanning period, and each process point submits to its respective monitorable resource a request for data indicative of a current value on a single occasion within each period.

Although the present disclosure assumes a "pull" approach for obtaining values for monitorable resources, in other embodiments a "push" approach is implemented for one or more of the monitorable resources. That is, one or more of the monitorable resources broadcasts or otherwise transmits data indicative of the relevant values, as opposed to providing those values in response to queries or requests.

Virtual building resources are described by location points, and include the likes of building locations (such as a floor in a building, a particular room, and so on), building resource types (such as chillers, surveillance systems, and so on), and in some cases fixed capital assets/physical equipment that provide a plurality of monitorable resources (such as a particular piece of equipment that provides monitorable resources such as temperature values, level readings, and so on).

The present embodiments make use of virtual building resources to provide a logical hierarchical structure in which to arrange monitorable resources (that is, location points provide a logical hierarchical structure for arranging process points). In particular, hierarchy is used to represent the arrangement of locations and physical equipment in a geographical context. This particularly contrasts with many prior art approaches, where monitorable resources are arranged in a flat structure, and a user typically finds it necessary to refer to a separate source to understand precisely which physical monitorable resource a particular point describes in a geographical context.

In the present embodiment, the data making up each point (process or location) includes, but is not limited to, the following:

- An item name. This name is user-defined, optionally in plain language, to describe a particular resource. In the present embodiments, there is no requirement that this name be unique in the context of point data 110. However, users are at liberty to implement a naming protocol to encourage some degree of "uniqueness" among similar resources. In some embodiments a constraint is applied on item names such that each point has a unique "full name". Full names are discussed below.
- A tag name. This is automatically defined, in the present example by server 100, and uniquely identifies the relevant point in the context of point data 110.
- A containment parent. This identifies a point beneath which the relevant point is to be directly nested in the context of the hierarchical structure. In some embodiments the containment parent is identified by way of its tag name.

It will be appreciated that in some embodiments more or fewer aspects of data are used.

As mentioned above, each point includes data indicative of an item name and a containment parent. This data is used to generate a full name for a given point, by reference to other points. In the present embodiment, full names are not stored in point data 110, and are instead derived upon the generation of point construct 105. A major rationale for this approach is to contain file-storage requirements and generally improve system efficiency.

A full name for a given point is essentially derived by compiling item names upwardly in the tree structure. The general intention is to provide a unique (or comparatively unique) name for a given point without necessarily having to assign to it a unique item name. In the presently considered embodiments, a full name is derived as follows. Assume a point with item name "Point A" has another point with item name "Point B" as its containment parent, and Point B in turn has a point with item name "Point C" as its containment parent. The full name for Point A is, in this example, given by "Point C/Point B/Point A". It will be appreciated that alternate approaches and/or protocols for deriving full names are used in further embodiments.

On startup of server 100, and optionally at later predefined times or upon the occurrence of predefined events, processor 101 loads point data 110 into volatile memory 102A to generate point construct 105. This point construct is essentially indicative of point data 110 arranged into a hierarchical structure on the basis of containment relationships. For example, upon the generation of points construct 105, each point is updated to include additional data which is not stored in non-volatile memory, such as data indicative of directly underlying points (child points), and data indicative of the number of directly underlying child points.

In the present embodiment, processor 101 also maintains point data 110 in volatile memory following startup to improve the efficiency of filtering, searching, and other operations. Additionally, in some embodiments process points run their respective monitoring functions from point data 110 rather than construct 105.

An important point of distinction between point data 110 and point construct 105 is that in the former it is difficult to quickly identify those points underlying a particular point (child points), given that for any given point only data indicative of a containment parent is provided. On the other hand, in the latter the containment relationships are constructed in volatile memory, which facilitates convenient identification of child relationships.

Figure 2:
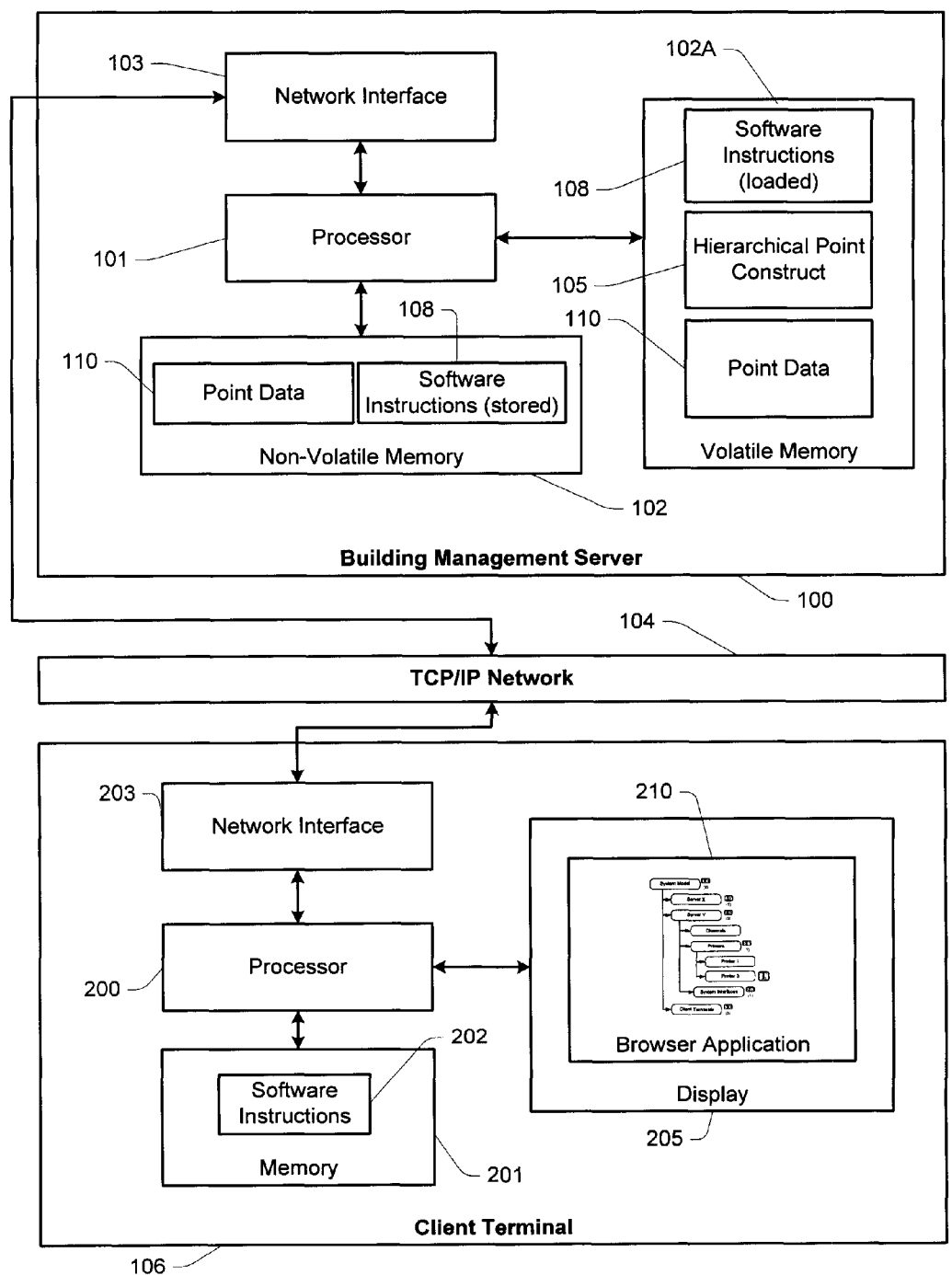
FIG. 2 schematically illustrates a client terminal according to one embodiment.

FIG. 2 schematically illustrates an exemplary client terminal 106. Terminal 106 includes a processor 200 coupled to a memory module 201 (including volatile memory and non-volatile memory in this instance), which maintains software instructions 202 for execution on processor 201. A network interface 203 is also coupled to processor 201 to allow terminal 106 to communicate with server 100 over network 104. Additionally, a display unit 205 is also coupled to processor 201 for providing graphical representations that are viewable by a user.

Software instructions 201 allow terminal 106 to execute a browser application 210, schematically shown in FIG. 2 as being displayed on display unit 205. This browser application is configured for displaying an interactive graphical representation of all or a selection of the points of point construct 105. Various exemplary screenshots from application 210 are discussed further below.

Graphical representations are, in the present embodiment, rendered on screen by application 210 much in the same way as web-pages are rendered in a traditional web browser, for example by way of HTML objects. However, in other embodiments alternate approaches are implemented. For example, in some embodiments a proprietary application is used as an alternative to a browser application.

In response to user interactions, browser application 210 communicates with server 100 to obtain data from point construct 105. A graphical representation of this data is rendered and displayed on screen by application 210, and is updated either in real time (that is, a change in construct 105 is replicated in application 210, for example based on a dynamic binding protocol) or upon a periodic refresh (that is, browser application 210 periodically requests updated data).

As foreshadowed, application 210 is configured for displaying an interactive graphical representation of all or a selection of the points in construct 105. The points that are actually displayable depend on the client using application 210. In this context, the term "client" refers either to a client identified by a username/password (or other identifier) who logs on to use application 210, or to a client terminal on which application 210 executes.

In the present embodiments, each client is designated a scope of responsibility, this scope of responsibility essentially identifying which points are viewable by that client. For some clients, this scope of responsibility allows representations indicative of any of the points to be viewed via application 210, whilst for other clients this scope of responsibility allows representations indicative of only a reduced selection of the points to be viewed via application 210.

The present disclosure deals with clients "having access to points". This means that the clients in question are able to view, via application 210, representations of those points.

Implementing such a scope of responsibility protocol has various advantages, including:

Reducing the amount of extraneous or irrelevant information that is provided to clients. If, on the basis of a subjective/objective analysis, it is determined that certain points (and points nested beneath those certain points) are not of concern to a particular client, the scope of responsibility for that client is defined such that those points are not displayed by application 210 for that client.

Limiting access to particular information, for example in light of security concerns. That is, only clients having predefined access permissions are permitted access to certain points (and points nested beneath those certain points). For example, a client defined by a terminal for use by third party maintenance personnel might be prevented from viewing points relating to critical business systems.

In the present embodiments, the scope of responsibility protocol is implemented by way of SOR (scope of responsibility) assignment. Specifically, at least some points are "SOR assignable", in which case they include data indicative of SOR assignment characteristics. These SOR assignment characteristics essentially indicate, for a given point, those clients (or groups/categories of clients) for which that point is SOR assigned.

In some cases, process points are not SOR assignable, and SOR assignment is carried out exclusively by way of location. For example, a point describing a reactor is SOR assignable rather than a point monitoring a thermostat that, in the context of the hierarchical structure, is nested beneath the point describing the reactor.

In the event that a point is not SOR assignable, it is presumed that all clients have access to that point in the event that they have access to its containment parent. That is, it is deemed that, in the event that a given point is not SOR assignable, the relevant point is effectively assigned to all clients with access to its containment parent.

The notion of SOR assignment is particularly distinguished from containment. Although it is common to describe a first point as being "assigned" to a second point in the sense that the first point has the second point as its containment parent, this is very different from SOR assignment.

Figure 3:
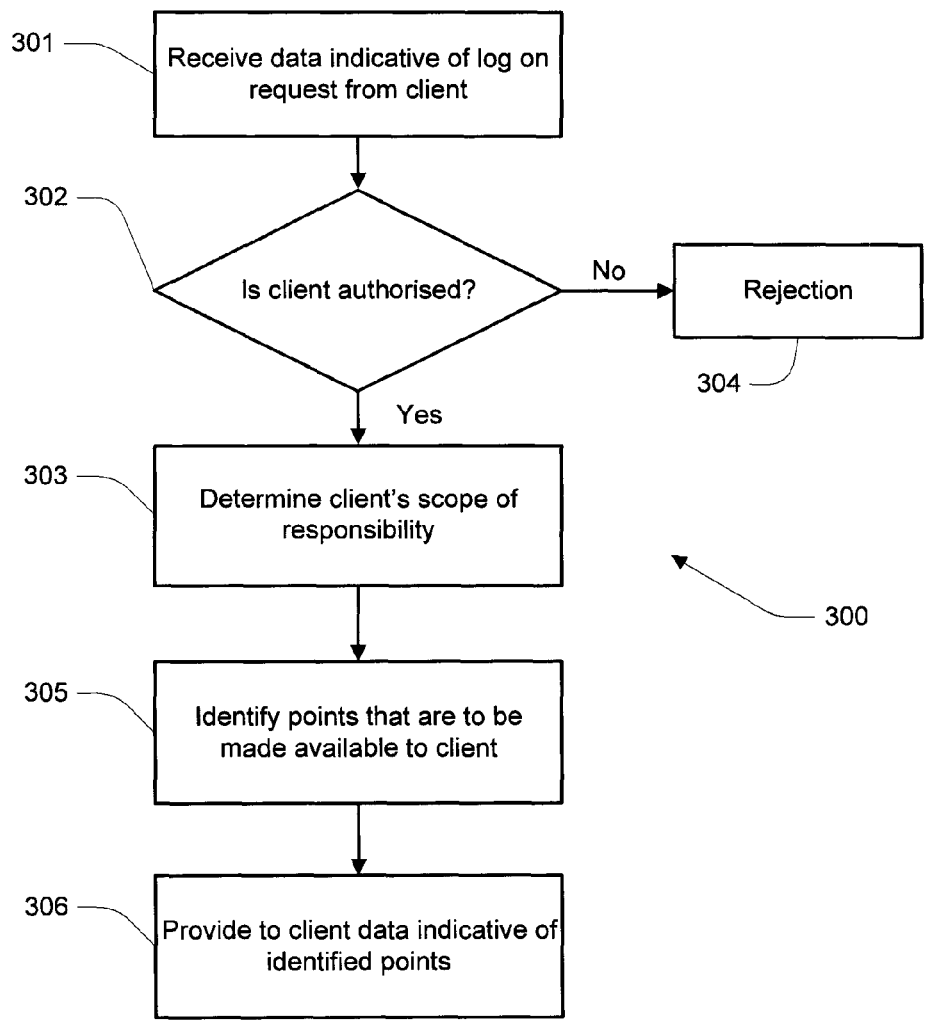
FIG. 3 illustrates a method according to one embodiment.

Application 210 and server 100 are configured to only make available to a given client those points SOR assigned to that client (and therefore falling within the scope of responsibility of that client). An exemplary method for implementing this is illustrated in FIG. 3 as method 300. This method is performable by server 100 on the basis of software instructions 108.

Method 300 includes, at step 301, receiving data indicative of a log on request from a client terminal 106. This log on request is initiated by the application 210 running on that terminal 106, and includes data indicative of the client using that application. The nature of this data varies between embodiments, and in some cases includes one or more of a username, password, client terminal IP address, application identifier, or another identifier. Step 302 includes determining whether the relevant client is authorized to access construct 103. For example, the data indicative of the client is assessed in light of a permissions database. In the event that the relevant client is authorized, the method progresses to step 303. Otherwise the method terminates at 304, which includes denying the client access.

Step 303 includes being responsive to the data indicative of the client for determining the scope of responsibility for that client. For example, this in some cases includes querying a permissions database or other table. Subsequently, step 305 includes identifying which points in point construct 103 are to be made available to the relevant client on the basis of that client's scope of responsibility. In this example, this process begins by considering points at the highest level of the hierarchical structure. In the event that a given point at this highest level is SOR assigned to the relevant client (by virtue of SOR assignment or non-SOR assignable status), that point is to be made available to the client. Points directly underlying that point are then considered in a similar manner, and the process continues downwards through the hierarchical structure.

SOR assignment characteristics are in some cases conveyed by simple numeric or alphanumeric identifiers, which are subsequently resolved to determine the scope of responsibility for a particular client on the basis of a permissions table or database. Such an approach assists in containing the file size of point data 110.

Step 306 includes providing to application 210 data indicative of the points identified at step 305. This data allows application 210 to provide interactive graphical representations of those points in the relevant hierarchical structure. The manner in which this is implemented varies between embodiments. For example:

- In some embodiments the data is indicative of all of the points identified at step 305.
- In some embodiments the data is indicative of all of the points identified at step 305 that are to be displayed on screen at that point in time. In the event that additional points are to be subsequently displayed (for example by expansion of the hierarchical structure, as discussed below), data indicative of those additional points is provided at that subsequent time.
- In some embodiments the generation of a graphically represented hierarchical structure based on the data indicative of points is carried out by application 210.
- In some embodiments the generation of a graphically represented hierarchical structure based on the data indicative of points is carried out at server 100, and subsequently displayed by application 210.
- In some embodiments a binding protocol binds data indicative of points maintained by application 210 to data in point construct 105 such that modification of a point in construct 105 is correspondingly applied in application 210. In some cases this is dynamic binding in real time, in other embodiments it is periodic binding (for example upon a "refresh" action). Such binding allows propagation of values for monitorable resources to propagate to application 210. Additionally, it allows propagation of alarm conditions to application 210, as discussed further below.

It will be appreciated that method 300 is provided for the sake of example only, and variations of this method are used in other embodiments.

Figure 4:
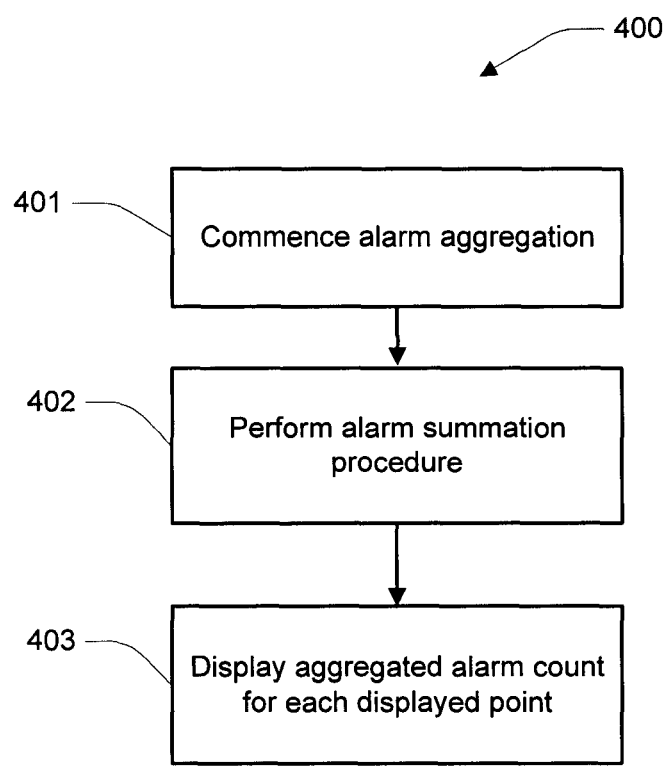
FIG. 4 illustrates a method according to one embodiment.

Some embodiments of the present invention provide an alarm aggregation functionality. In particular, a process point (which is representative of a monitorable resource) includes data indicative of an operational state, for example a temperature value or the like. When this operational state meets predefined requirements (or in response to other factors) an alarm condition is raised in relation to that process point. Alarm conditions are upwardly aggregated in the hierarchical structure such that an alarm condition associated with a given one of the process points is identifiable based on one or more location points beneath which that point is nested. An example of how this is performed is described by reference to method 400 of FIG. 4.

Step 401 includes commencing alarm aggregation. In some cases, this step is performed on a periodic basis (in some cases continually), and in other cases in response to predefined conditions being met. For example, in one embodiment the predefined conditions include data indicative of an alarm condition being raised or cancelled in respect of a monitorable resource, and as such aggregation occurs substantially in real time.

Step 402 includes performing an alarm summation procedure. In overview, location points each have an associated alarm count, which is a numerical identifier defined by the summation of the alarm counts of directly underlying location points and the number of directly underlying process points in respect of which alarm conditions are raised. The alarm summation procedure is implemented such that alerts upwardly aggregate. That is, for accurate results to be obtained, summation should commence at the lowest level and continue upwards to the highest level. It will be appreciated that various approaches to summation are implemented across various embodiments.

Step 403 includes displaying for each graphically represented location point the aggregated alarm count determined by the summation procedure. This will be more fully understood in light of examples considered further below.

In some embodiments method 400 is performed by application 210, and in other embodiments it is performed within server 100. It will be appreciated that the former approach allows for scope of responsibility considerations to be readily applied. That is, alarm counts are aggregated only for those location points accessible to application 210.

FIG. 5A to FIG. 5D illustrate various exemplary screenshots provided by an exemplary embodiment of application 210. These are provided for the sake of illustration only, so as to assist the reader in understanding how hierarchical structures are represented in some embodiments, particularly in the form of hierarchical tree structures. It will be appreciated that these screenshots are not intended to be limiting in any way.

In these screenshots, points are represented by interactive buttons, each button carrying the item name for its respective point. These buttons are interactive in the sense that a user interacts with a given one of the buttons to expand the next underlying level of the tree structure, or to collapse all underlying levels of the tree structure. In some embodiments this interaction is by way of a "double-click", however alternate approaches are used in other embodiments. For example, in some embodiments "+" and "−" tabs are provided for respectively expanding or collapsing levels. It will be appreciated that various alternate graphical user interfaces and hierarchical structures (including both tree structures and other hierarchical structures) are implemented across various embodiments.

Figure 5A:
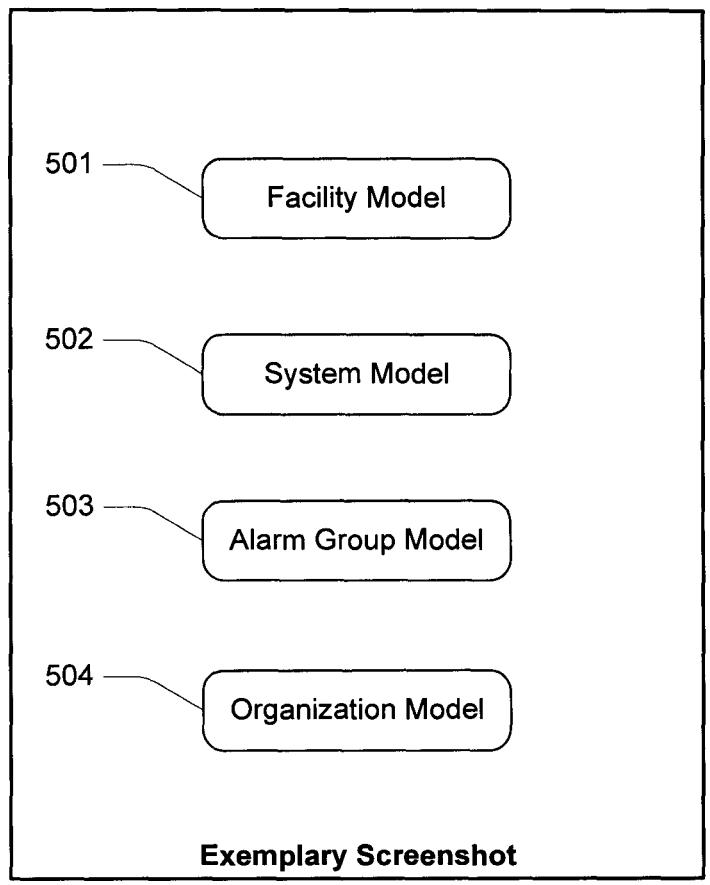
FIG. 5A schematically illustrated an exemplary screenshot from a software application according to one embodiment.

Referring initially to FIG. 5A, representations of four "root points" are provided. These are in the form of a facility model 501, system model 502, alarm group model 503 and organization model 504.

In the present embodiments, each point belongs to one of a plurality of point categories. To this end, each point includes data indicative of its point category, typically as a simple numeric or alphanumeric identifier. Points belonging to a similar category are hierarchically nested beneath a common root parent representative of that category. In the present embodiment there are two main categories: a "facility" category and a "system" category. These two categories make a distinction between resources that are inherent parts of a building (such as locations, physical assets, plant and other equipment, and so on) and resources that are introduced to the building to allow the implementation of a building management system (such as server 100 and other similar servers, network components such as switches and routers, client terminals, peripheral or networked printers, and so on. The underlying intention is to make a significant distinction between resources that server 100 installed to monitor ("core" resources) and resources that are installed to allow server 100 to perform this monitoring an associated actions ("system" resources). The former are typically of concern to personnel working within the relevant building, whilst the latter are typically of concern to personnel responsible for the maintenance of server 100 and a wider building resource management system.

Points belonging to the facility category are hierarchically nested beneath facility model 501. Points belonging to the system category are hierarchically nested beneath system model 502.

Figure 5B:
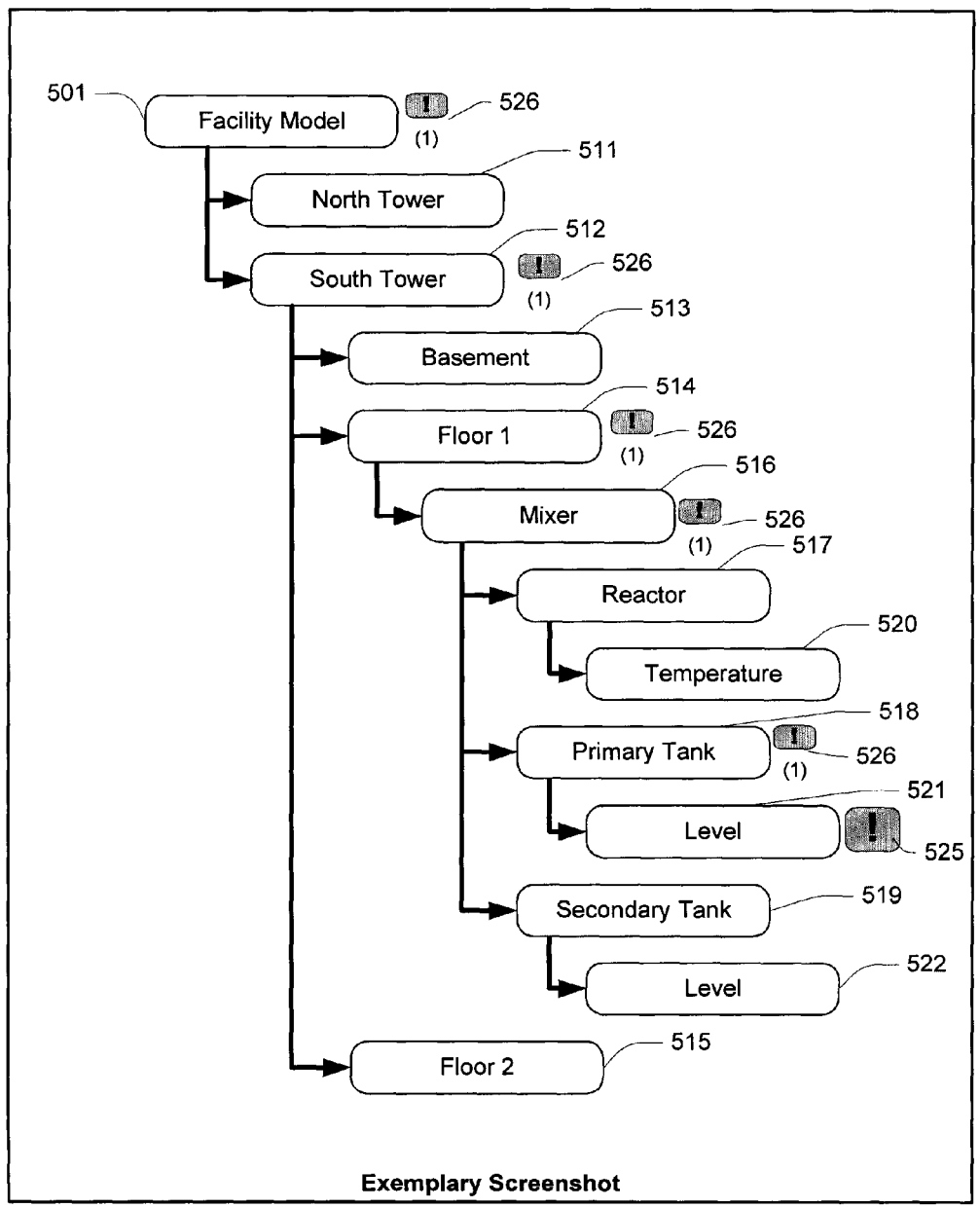
FIG. 5B schematically illustrated an exemplary screenshot from a software application according to one embodiment.

FIG. 5B shows an exemplary screenshot where a number of points underlying the facility model 501 have been expanded. These are:

North tower point 511. This location point describes a location, being a north tower of a multi-tower facility. Its full name is "facility model/north tower".

South tower point 512. This location point describes a location, being a south tower of a multi-tower facility. Its full name is "facility model/south tower".

Basement point 513. This location point has south tower point 512 as its containment parent, and describes a basement region in the south tower. Its full name is "facility model/south tower/basement".

Floor 1 point 514. This location point has south tower point 512 as its containment parent, and describes a first floor region in the south tower. Its full name is "facility model/south tower/floor 1".

Floor 2 point 515. This location point has south tower point 512 as its containment parent, and describes a second floor region in the south tower. Its full name is "facility model/south tower/floor 2".

Mixer point 516. This location point has floor 1 point 514 as its containment parent, and describes a mixer on the second floor of the south tower. Its full name is "facility model/south tower/floor 1/mixer".

Reactor point 517. This location point has mixer point 516 as its containment parent, and describes a reactor in the mixer on floor 1 of the south tower. Its full name is "facility model/south tower/floor 1/mixer/reactor".

Primary tank point 518. This location point has mixer point 516 as its containment parent, and describes a reactor in the mixer on floor 1 of the south tower. Its full name is "facility model/south tower/floor 1/mixer/primary tank".

Secondary tank point 519. This location point has mixer point 516 as its containment parent, and describes a reactor in the mixer on floor 1 of the south tower. Its full name is "facility model/south tower/floor 1/mixer/secondary tank".

Temperature point 520. This process point has reactor point 517 as its containment parent, and monitors a temperature reading in a reactor in the mixer on floor 1 of the south tower. Its full name is "s facility model/south tower/floor 1/mixer/reactor/temperature".

Level point 521. This process point has primary tank point 518 as its containment parent, and monitors a level reading in a primary tank in the mixer on floor 1 of the south tower. Its full name is "facility model/south tower/floor 1/mixer/primary tank/level".

Level point 522. This process point has secondary tank point 519 as its containment parent, and monitors a level reading in a secondary tank in the mixer on floor 1 of the south tower. Its full name is "facility model/south tower/floor 1/mixer/secondary tank/level".

In the present embodiments, the root parents are used when deriving full names for points. However, a contrary position is adopted in further embodiments.

In the example of FIG. 5B, an alarm condition is raised in relation to level point 521, as indicated by a graphically represented alarm identifier 525. This alarm condition is upwardly aggregated in the hierarchical structure such that it is identifiable based any of the location points beneath which process point 512 is nested. In particular, a non-zero alarm count is identified adjacent location points 512, 514, 516, and 518 by an alarm count identifier 526. This alarm count identifier provides a representation of the alarm count, in the event that the alarm count is non-zero. In the present embodiment, an identifier 526 is also displayed adjacent facility model button 501.

Figure 5C:
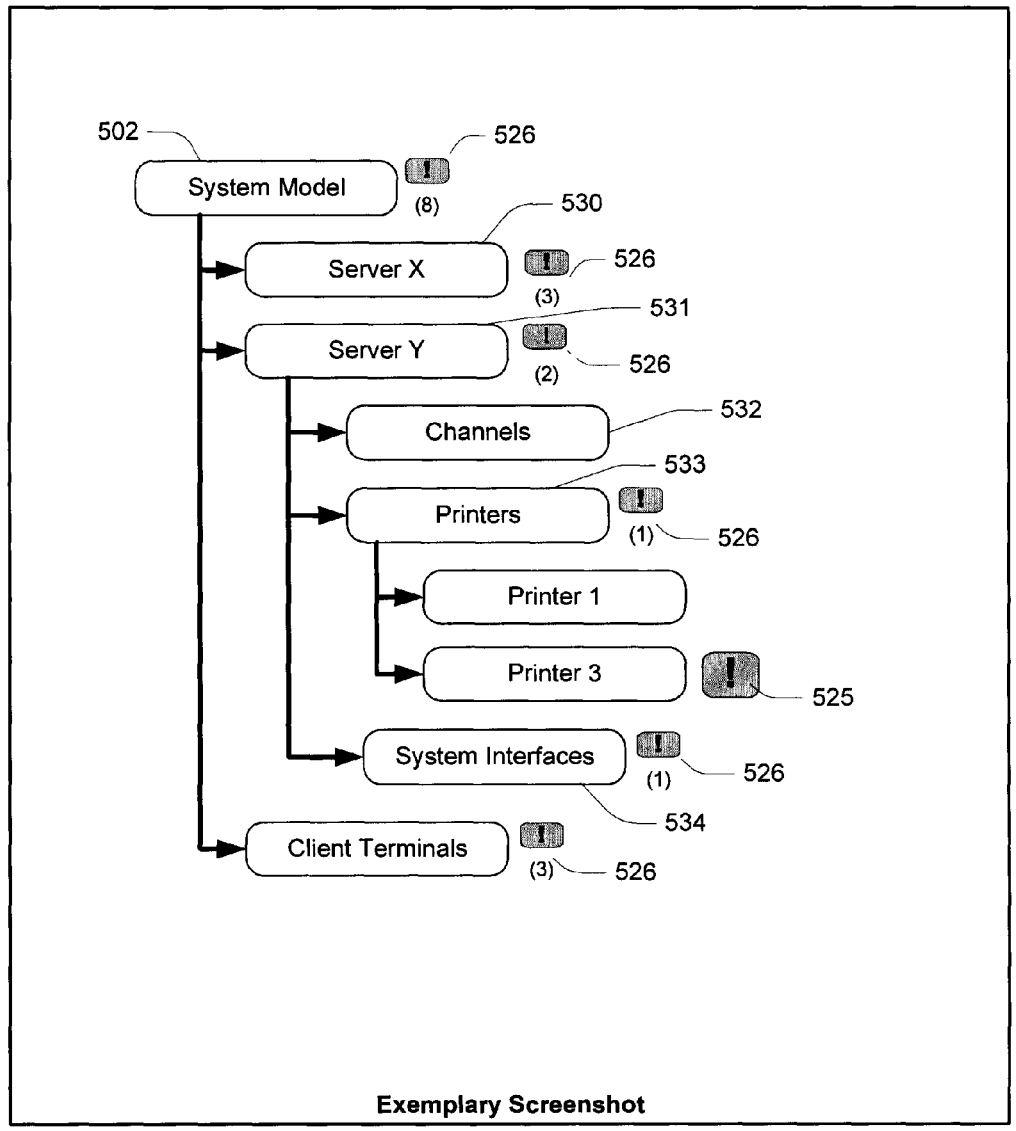
FIG. 5C schematically illustrated an exemplary screenshot from a software application according to one embodiment.

A further example is provided in FIG. 5C, which shows an exemplary screenshot where a plurality of points belonging to the system model has been expanded. In this example, a greater number of alarm conditions are considered, and it will be recognized how these are upwardly aggregated. In particular, it is shown that an alarm identifier provides a count of underlying alarms regardless of whether the process points to which those alarms relate are displayed. For example, server X point 530 shows three alarms, although no underlying points (process or location) are currently displayed.

In the context of FIG. 5C, Server Y point 531 sums alarm counts for channels point 532 (no alarms), printers point 533 (1 alarm) and system interfaces point 534 (1 alarm), and therefore provides an alarm count of two.

In the present embodiments, aggregation is performed in a manner to take into consideration scope of responsibility concerns. The rationale is that only alarms in respect of monitorable resources nested beneath points falling within that clients scope of responsibility should be aggregated for a given client. For example, in the context of FIG. 5B, assume that mixer point 516 is not SOR assigned to a particular client. In that case, points 517 to 522 are not displayed to that client, and the alarm count for points 514 and 512 as viewed by that client are both zero. This, of course, assumes that the client in question does not have SOR assigned to it other points nested beneath points 514 and 512 that are not shown in FIG. 5B and for which a non-zero alarm count applies.

Figure 5D:
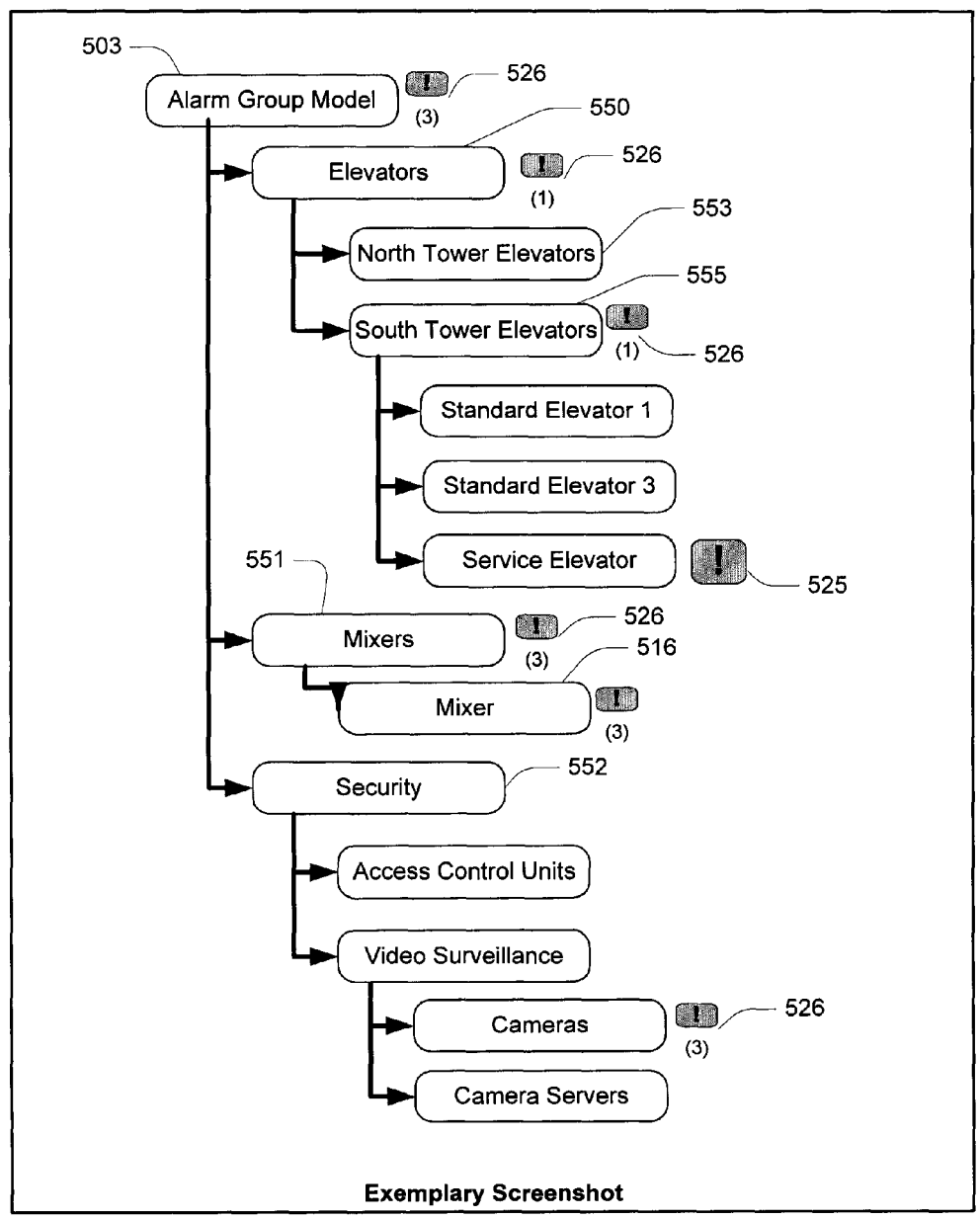
FIG. 5D schematically illustrated an exemplary screenshot from a software application according to one embodiment.

Alarm group model 503 allows for the user-creation of "alarm groups", and an exemplary screenshot in which alarm group model 503 is partially expanded is provided in FIG. 5D. In overview, the impetus for an alarm group model is derived from a realization that a hierarchical structure based on location (such as the facility model) is not necessarily ideal for all situations. Instead, there is a practical benefit from arranging like resources beneath a common parent irrespective of their location.

In the present embodiment, the alarm group model is implemented by first defining alarm group points to describe like resources. In the example of FIG. 5D, the like resources include elevators (described by point 550), mixers (described by point 551) and security (described by point 552). These are first tier alarm group points, as they each have as their containment parent alarm group model 503. In the present embodiment there are also secondary (and further) alarm group models to allow the alarm group to provide a logical hierarchical structure where it is sensible to do so. For example, in the context of FIG. 5D, alarm group points 553 and 555 respectively describe north tower elevators and south tower elevators.

Once alarm group points are defined, process points that are to belong to those alarm groups are updated to include data indicative of one or more reference relationships. To this end, in the context of the present embodiments, process points are configured to include data indicative of a single containment parent, which is used to allow generation the facility model and system model, and one or more reference relationships, which is used to allow generation of the alarm model.

In some embodiments location points are also configured to optionally maintain reference relationship data for the purposes of the alarm group model.

For the purposes of the alarm group model, points describing common resources are selectively provided with data indicative of a reference relationship with one or more alarm group points. For example, in the context of FIG. 5D, mixer point 516 (also shown in FIG. 5B) has a reference relationship with alarm group point 551, which describes all mixers. In the present example, there is only a single mixer.

Alarm aggregation in the alarm group model occurs in substantially the same manner as in the other models. That is, each point summates the alarm counts for directly underlying location points and the number of directly underlying process points for which alarm conditions are raised.

Alarm group points are SOR assignable to implement scope of responsibility. It will be appreciated that alarm groups are often purpose-defined with a particular one or more clients in mind, and in some cases such alarm group points are SOR assigned only to those one or more clients.

Organization model 504 differs from the other models in that the points describe cardholders and groups/categories of cardholders in an access control environment. In this manner, it essentially provides a hierarchical interface for navigating data indicative of cardholders, with the points preferably being hierarchically arranged responsive to organization, department, floor and/or other criteria. In some embodiments the points making up the organization model are obtained from a source other than point data 110, such as a discrete information source (such as a database or database server) that is pre-configured to store data indicative of cardholders.

The term "cardholder" should not be read to necessarily imply a person having a "card", although that is the case in some access control environments. Rather, the term cardholder is used to describe any person having an access permission, which is identifiable based on an identifier able to be provided via a card, password, passcode, biometric information, and so on.

Some embodiments provide a "quickbuilder" component for reducing engineering time during the initial configuration of a system at a particular location. This is particularly relevant to a facility model, but also has significant application in the context of an alarm group model.

In overview, taking the example of a facility model, the present embodiments make use of virtual building resources to provide a logical hierarchical structure in which to arrange monitorable resources (that is, location points provide a logical hierarchical structure for arranging process points). The hierarchy is used to represent the arrangement of locations and physical equipment in a geographical context.

It will be appreciated that, during an initial engineering phase, it is a time consuming task to define location points and process points to define locations within a building, and infrastructure at those locations. A quickbuilder component allows for significant timesaving in this regard, based on a realization that many zones within a building are similar. This is discussed in greater detail below.

Figure 6A:
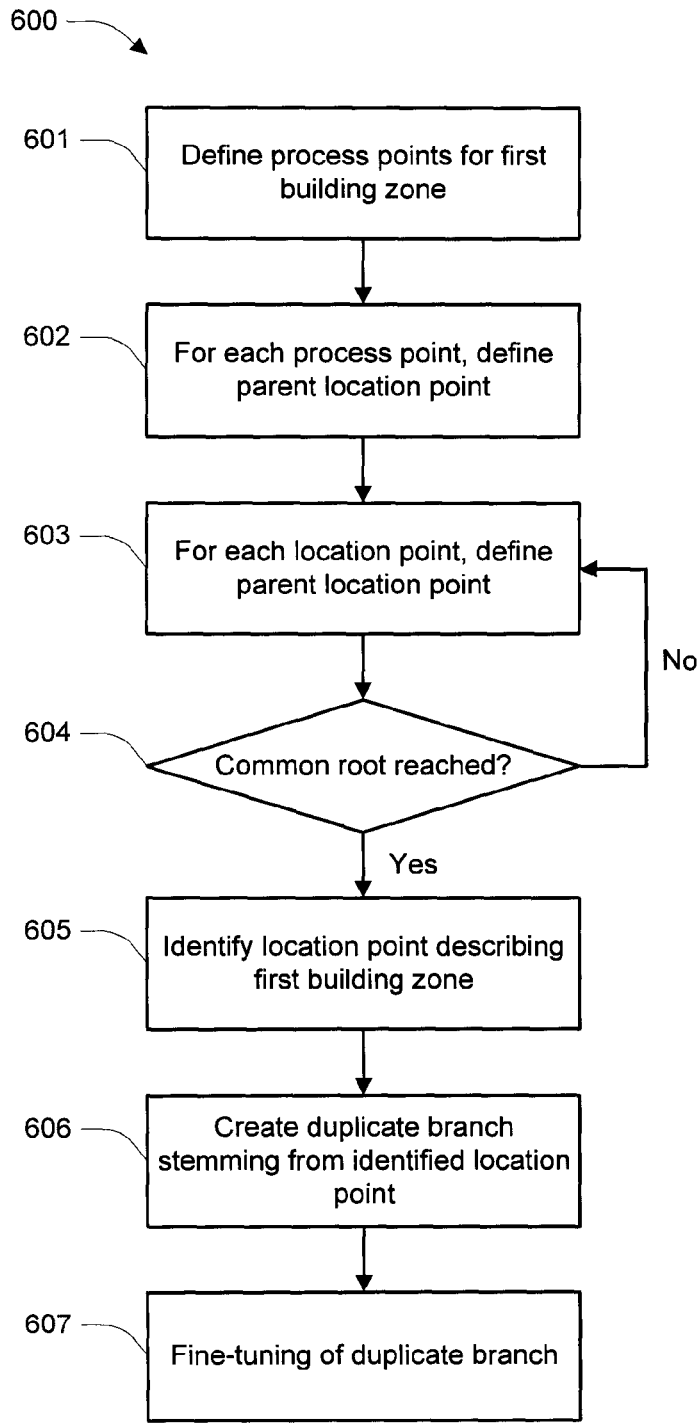
FIG. 6A illustrates a method according to one embodiment.

FIG. 6A illustrates a method 600 for performing preliminary engineering of point data for a system as generally described above, based on a quickbuilder component. Step 601 includes defining process points for a first building zone. These process points are, in some embodiments, auto-discoverable. The term "first building zone" is used to describe a user-identified section of a building that is relatively common in the overall context of a building. A prime example is a floor in a high-rise building—most floors tend to be quite similar in broad terms. For example, each floor tends to have a collection of the same facility items, such as thermostats, surveillance equipment, lighting, and so on. The relevance of the first building zone will be come more apparent in light of later steps in method 600.

Step 602 includes, for each process point, defining a patent location point. As discussed further above, each point includes data indicative of a containment parent. In some cases. Step 603 continues this process by defining containment relationships for the parent of the process point, and by way of decision 604, the process continues until all points defined by way of method 600 have, upwardly following containment relationships, the model's root point as the ultimate containment parent. In other words, for any of the process points defined at step 601, containment relationships can be followed to a common root point (i.e. the root of the facility model).

Step 605 includes identifying a location point that describes the first building zone. It will be appreciated that all of the process points defined at step 601 will be nested beneath this identified point as a common containment parent in the context of the hierarchical structure. That is, those process points are the "leaves" for a "branch" commencing at the common containment parent.

Step 606 includes creating a duplicate branch based on the common containment parent. The duplicate branch provides a template for describing a second building zone. For example, where the first building zone describes a floor in a building, the common containment parent describes that floor, and the duplicate branch provides a template for describing a one or more of the plurality of points are assigned respective adjusted item names. That is, for example, the branch point might have its item name adjusted from "Floor X" to "Floor Y".

Step 607 includes fine-tuning of the duplicate branch. This includes modifying the duplicate process points such that they bind with appropriate resources on the new floor. This optionally further includes adding further location and/or process points to the duplicated branch, which essentially serves as a structural template.

Figure 6B:
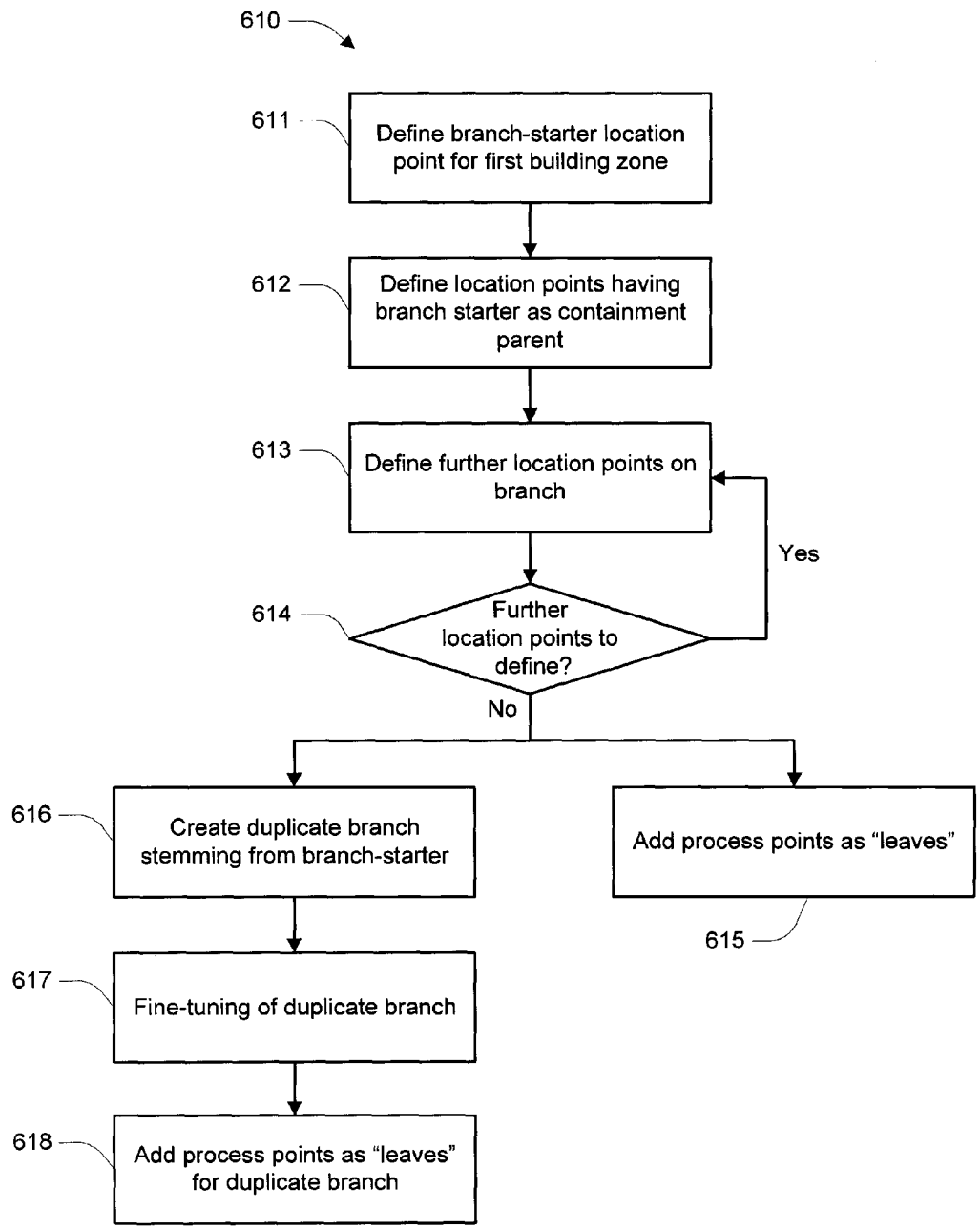
FIG. 6B illustrates a method according to one embodiment.

Although the above example assumes a bottom-up approach for the defining of location points (i.e. leaves first, then upwards along a branch), in other embodiments a top-down approach is used (i.e. working from a root point, along branches, down to the leaves). For example, method 610 of FIG. 6B illustrates a top-down approach. Step 611 includes defining a "branch-starter" location point for a building zone, such as a point describing a particular floor in a building. Step 612 includes defining immediately underlying location points, and step 613 in combination with decision 614 include defining further underlying location points. This overall process allows the branch to describe a location framework for the building zone. Following this, process points are added for that building zone at step 615. It will be appreciated that this step effectively includes identifying a process point, and assigning to it a containment patent reflective of the appropriate location within the building zone.

Steps 616 and 617 include the duplication and fine-tuning of the branch so as to describe another building zone. Process points for that building zone are added at step 618.

Figure 6C:
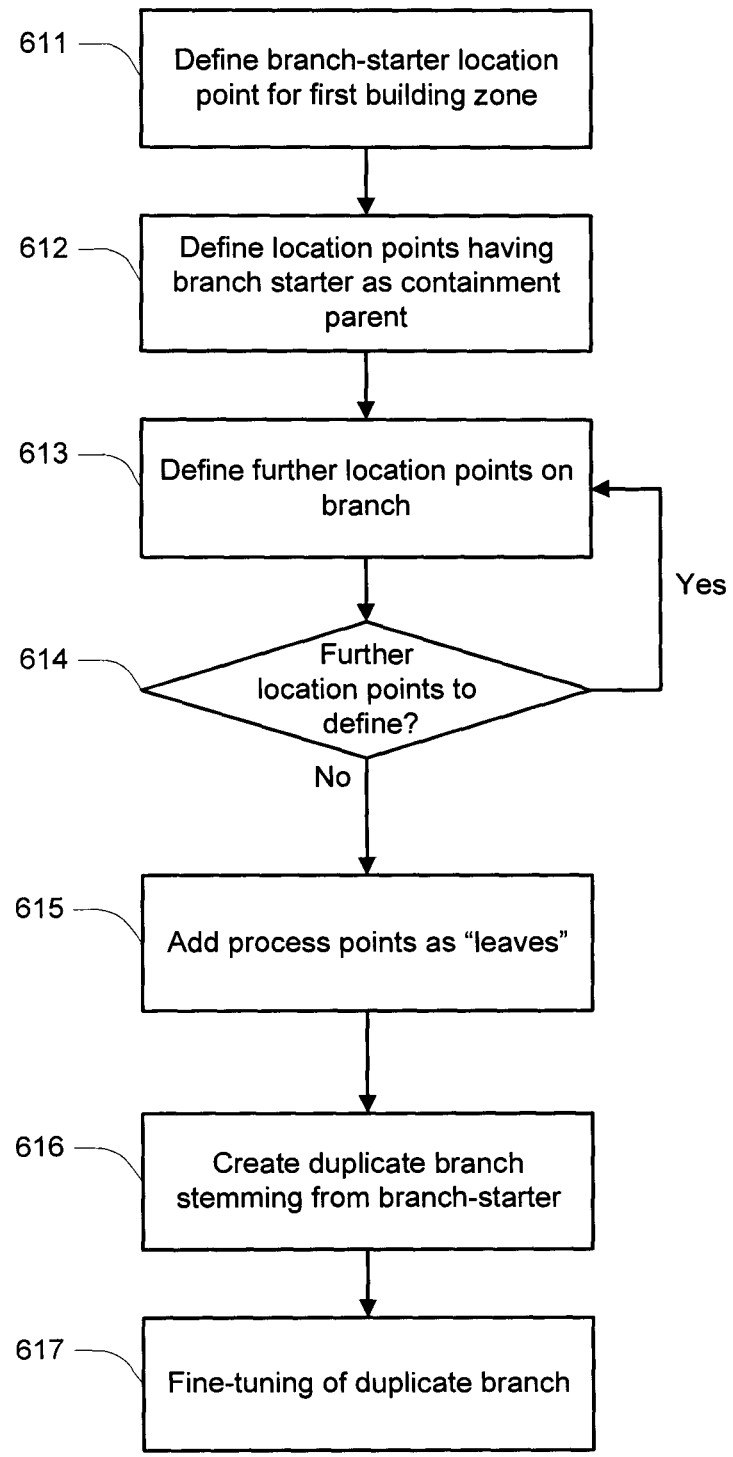
FIG. 6C illustrates a method according to one embodiment.

FIG. 6C illustrates a method 620, which is a variation on method 610. In overview, whereas in the context of method 610 the defining of process points occurs independent of duplication, in method 620 the duplication includes duplication of process points. This is based on an assumption that each building zone will have similar process points. However, the duplicated process points do not initially reference a physical target, and require fine-tuning at step 607 so that they appropriately describe their respective targets.

It will be appreciated that the above disclosure provides various systems and methods for managing building resources, these systems and method having various features and functionalities that provide advantages over the prior art.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of building management system. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A method, performed by operation of a processor, for configuring a building management system to provide a graphical interface that represents building resources, the method including the steps of:

operating the processor thereby to enable the defining of data indicative of a plurality of points, each point including data indicative of an item name, data indicative of a containment parent, and data indicative of an operational state, wherein the plurality of points include:

a plurality of process points, wherein each process point describes a physical building resource having a value that is monitored over a network, wherein the process point is configured to periodically obtain over the network data indicative of the value, wherein each process point is defined by reference to a unique containment parent in the form of a location point;

a plurality of location points, wherein each location point describes a location of either one or more process points or one or more location points, wherein each location point is defined by reference to a unique containment parent in the form of a location point or a root parent;

operating the processor to generate, for the plurality of points, on the basis of their respective data indicative of containment parents, a construct indicative of a hierarchical structure wherein each point is nested beneath its containment parent;

operating the processor to associate, in the case that, for a given one of the plurality of points, the data indicative of an operational state meets predefined characteristics, an alarm condition with that point; and operating the processor to upwardly aggregate alarm conditions in the hierarchical structure to facilitate an alarm condition associated with a given one of the plurality of points to be identified based on one or more points beneath which that point is nested.

2. The method according to claim 1 wherein the plurality of points each belong to one of a plurality of point categories, and wherein points belonging to a similar category are hierarchically nested beneath a common root parent representative of that category, and wherein the plurality of point categories include:

a facility category, wherein one or more points belong to the facility category, wherein the one or more points belonging to the facility category are hierarchically nested beneath a common facility root parent, and wherein the one or more points belonging to the facility category are representative of either a facility monitorable resource or a building descriptor; and a system category, wherein one or more points belong to the system category, wherein the one or more points belonging to the system category are hierarchically nested beneath a common system root parent, and wherein the one or more points belonging to the system category are representative of either a system device or a system descriptor.

3. The method according to claim 2 wherein the plurality of point categories include a user category, wherein one or more points belonging to the user category are hierarchically nested beneath a common user root parent, and wherein the one or more points belonging to the user category are representative of either a user device or a user descriptor.

4. The method according to claim 1 wherein the plurality of points include one or more Scope of Responsibility (SOP) assignable points that are selectively SOR assigned to one or more clients on the basis of a scope of responsibility protocol.

5. The method according to claim 4 wherein a given client is able to view an SOR assignable point, and points nested beneath that SOR assignable point, only in the case that the SOR assignable point has been SOR assigned to that client.

6. The method according to claim 1 wherein the hierarchical structure is at least in part represented as an expandable tree-structure in a graphical user interface.

7. A non-transitory computer-readable medium storing a set of instructions that when executed by one or more processors cause the one or more processors to carry out a method for configuring a building management system to provide a graphical interface that represents building resources including:

defining of data indicative of a plurality of points, each point including data indicative of an item name, data indicative of a containment parent, and data indicative of an operational state, wherein the plurality of points include:

a plurality of process points, wherein each process point describes a physical building resource having a value that is monitored over a network, wherein the process point is configured to periodically obtain over the network data indicative of the value, wherein each process point is defined by reference to a unique containment parent in the form of a location point;

a plurality of location points, wherein each location point describes a location of either one or more process points or one or more location points, wherein each location point is defined by reference to a unique containment parent in the form of a location point or a root parent;

for the plurality of points, on the basis of their respective data indicative of containment parents, generating a construct indicative of a hierarchical structure wherein each point is nested beneath its containment parent;

in the case that, for a given one of the plurality of points, the data indicative of an operational state meets predefined characteristics, associating an alarm condition with that point; and upwardly aggregating alarm conditions in the hierarchical structure to facilitate an alarm condition associated with a given one of the plurality of points to be identified based on one or more points beneath which that point is nested.

8. A system for managing building resources, the system including a processor configured for performing a method for configuring a building management system to provide a graphical interface that represents building resources including:

defining of data indicative of a plurality of points, each point including data indicative of an item name, data indicative of a containment parent, and data indicative of an operational state, wherein the plurality of points include:

a plurality of process points, wherein each process point describes a physical building resource having a value that is monitored over a network, wherein the process point is configured to periodically obtain over the network data indicative of the value, wherein each process point is defined by reference to a unique containment parent in the form of a location point;

a plurality of location points, wherein each location point describes a location of either one or more process points or one or more location points, wherein each location point is defined by reference to a unique containment parent in the form of a location point or a root parent;

for the plurality of points, on the basis of their respective data indicative of containment parents, generating a construct indicative of a hierarchical structure wherein each point is nested beneath its containment parent;

in the case that, for a given one of the plurality of points, the data indicative of an operational state meets predefined characteristics, associating an alarm condition with that point; and upwardly aggregating alarm conditions in the hierarchical structure to facilitate an alarm condition associated with a given one of the plurality of points to be identified based on one or more points beneath which that point is nested.

9. A method for modeling building resources, the method including the steps of:

defining of data indicative of a plurality of points, each point including data indicative of an item name, data indicative of a containment parent, and data indicative of an operational state, wherein the plurality of points include:

a plurality of process points, wherein each process point describes a physical building resource having a value that is monitored over a network, wherein the process point is configured to periodically obtain over the network data indicative of the value, wherein each process point is defined by reference to a unique containment parent in the form of a location point;

a plurality of location points, wherein each location point describes a location of either one or more process points or one or more location points, wherein each location point is defined by reference to a unique containment parent in the form of a location point or a root parent;

reading from a storage location data indicative of the plurality of points;

for the plurality of points, on the basis of their respective data indicative of containment parents, generating a construct indicative of a hierarchical structure wherein each point is nested beneath its containment parent;

being responsive to a request from a client to access the construct by determining a scope of responsibility for the client;

on the basis of the determined scope of responsibility, identifying one or more of the plurality of points in the construct that are to be made available to the client; and making available to the client data indicative of the identified one or more points by allowing the client to view an interactive representation of the identified one or more points in a hierarchical structure.

10. The method according to claim 9 including the steps of:

in the case that, for a given one of the plurality of points, the data indicative of an operational state meets predefined characteristics, associating an alarm condition with that point;

upwardly aggregating alarm conditions in the hierarchical structure to facilitate an alarm condition associated with a given one of the plurality of points to be identified based on one or more points beneath which that point is nested.

11. The method according to claim 9 wherein the plurality of points each belong to one of a plurality of point categories, and wherein points belonging to a similar category are hierarchically nested beneath a common root parent representative of that category, and wherein the plurality of point categories include:

a facility category, wherein one or more points belong to the facility category, wherein the one or more points belonging to the facility category are hierarchically nested beneath a common facility root parent, and wherein the one or more points belonging to the facility category are representative of either a facility monitorable resource or a building descriptor; and a system category, wherein one or more points belong to the system category, wherein the one or more points belonging to the system category are hierarchically nested beneath a common system root parent, and wherein the one or more points belonging to the system category are representative of either a system device or a system descriptor.

12. The method according to claim 11 wherein the plurality of point categories include a user category, wherein one or more points belonging to the user category are hierarchically nested beneath a common user root parent, and wherein the one or more points belonging to the user category are representative of either a user device or a user descriptor.

13. The method according to claim 9 wherein the plurality of points include one or more Scope of Responsibility (SOR) assignable points that are selectively SOR assigned to one or more users on the basis of a scope of responsibility protocol.

14. The method according to claim 13 wherein a given user is able to view an SOR assignable point, and points nested beneath that SOR assignable point, only in the case that the SOR assignable point has been SOR assigned to that user.

15. The method according to claim 9 wherein the hierarchical structure is represented as an expandable tree-structure in a graphical user interface.

16. A non-transitory computer-readable medium storing a set of instructions that when executed by one or more processors cause the one or more processors to carry out a method including:

enabling defining of data indicative of a plurality of points, each point including data indicative of an item name, data indicative of a containment parent, and data indicative of an operational state, wherein the plurality of points include:

a plurality of process points, wherein each process point describes a physical building resource having a value that is monitored over a network, wherein the process point is configured to periodically obtain over the network data indicative of the value, wherein each process point is defined by reference to a unique containment parent in the form of a location point;

a plurality of location points, wherein each location point describes a location of either one or more process points or one or more location points, wherein each location point is defined by reference to a unique containment parent in the form of a location point or a root parent;

reading from a storage location data indicative of the plurality of points;

for the plurality of points, on the basis of their respective data indicative of containment parents, generating a construct indicative of a hierarchical structure wherein each point is nested beneath its containment parent;

being responsive to a request from a client to access the construct by determining a scope of responsibility for the client;

on the basis of the determined scope of responsibility, identifying one or more of the plurality of points in the construct that are to be made available to the client; and making available to the client data indicative of the identified one or more points by allowing the client to view an interactive representation of the identified one or more points in a hierarchical structure.

17. A system for managing building resources, the system including a processor configured for performing a method including:

enabling defining of data indicative of a plurality of points, each point including data indicative of an item name, data indicative of a containment parent, and data indicative of an operational state, wherein the plurality of points include:

a plurality of process points, wherein each process point describes a physical building resource having a value that is monitored over a network, wherein the process point is configured to periodically obtain over the network data indicative of the value, wherein each process point is defined by reference to a unique containment parent in the form of a location point;

a plurality of location points, wherein each location point describes a location of either one or more process points or one or more location points, wherein each location point is defined by reference to a unique containment parent in the form of a location point or a root parent;

reading from a storage location data indicative of the plurality of points;

for the plurality of points, on the basis of their respective data indicative of containment parents, generating a construct indicative of a hierarchical structure wherein each point is nested beneath its containment parent;

being responsive to a request from a client to access the construct by determining a scope of responsibility for the client;

on the basis of the determined scope of responsibility, identifying one or more of the plurality of points in the construct that are to be made available to the client; and making available to the client data indicative of the identified one or more points by allowing the client to view an interactive representation of the identified one or more points in a hierarchical structure.

18. A method for modeling building resources, the method being performed by operation of a processor, the method including the steps of:

enabling defining of data indicative of a plurality of points, each point including data indicative of an item name, data indicative of a containment parent, and data indicative of an operational state, wherein the plurality of points include:

a plurality of process points, wherein each process point describes a physical building resource having a value that is monitored over a network, wherein the process point is configured to periodically obtain over the network data indicative of the value, wherein each process point is defined by reference to a unique containment parent in the form of a location a plurality of location points, wherein each location point describes a location of either one or more process points or one or more location points, wherein each location point is defined by reference to a unique containment parent in the form of a location point or a root parent;

operating the processor to identify data indicative of the plurality of points, wherein the plurality of points have a common containment parent describing a first building zone; and operating the processor to create a duplicate branch based on the common containment parent, wherein the duplicate branch provides a template for describing a second building zone, and wherein respective duplications of one or more of the plurality of points are assigned respective adjusted item names.

\* \* \* \* \*